(No Model.)  3 Sheets—Sheet 1.
L. O. DION.
CLOSED CONDUIT FOR ELECTRIC RAILWAYS.
No. 488,351. Patented Dec. 20, 1892.
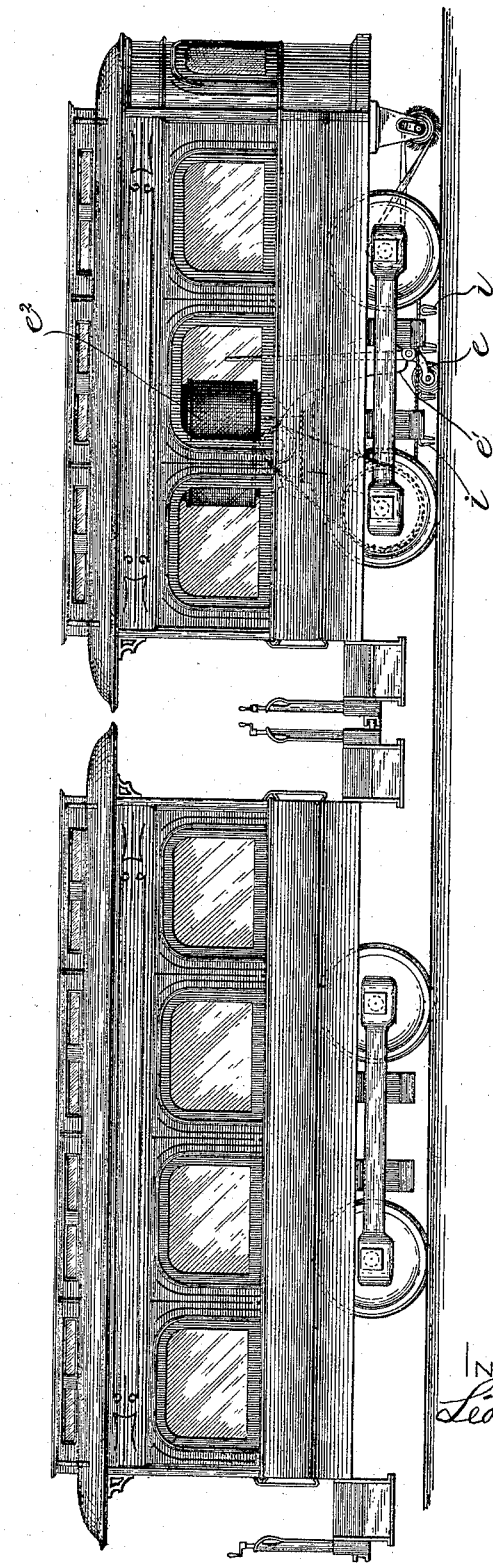
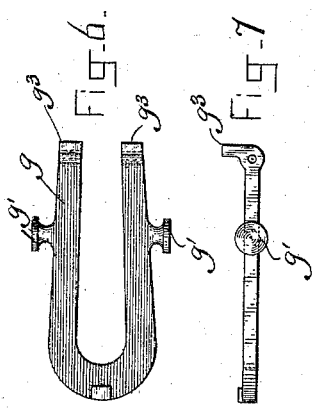
WITNESSES:
Thomas H. Seely.
Chas. S. Gooding.
INVENTOR:
Léon O. Dion (No Model.) 3 Sheets—Sheet 2.
L. O. DION.
CLOSED CONDUIT FOR ELECTRIC RAILWAYS.
No. 488,351. Patented Dec. 20, 1892.
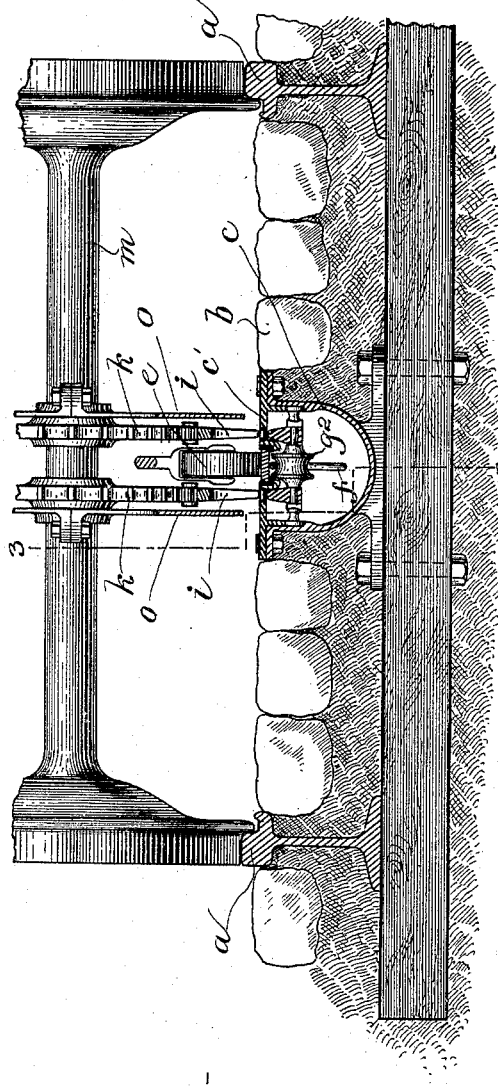
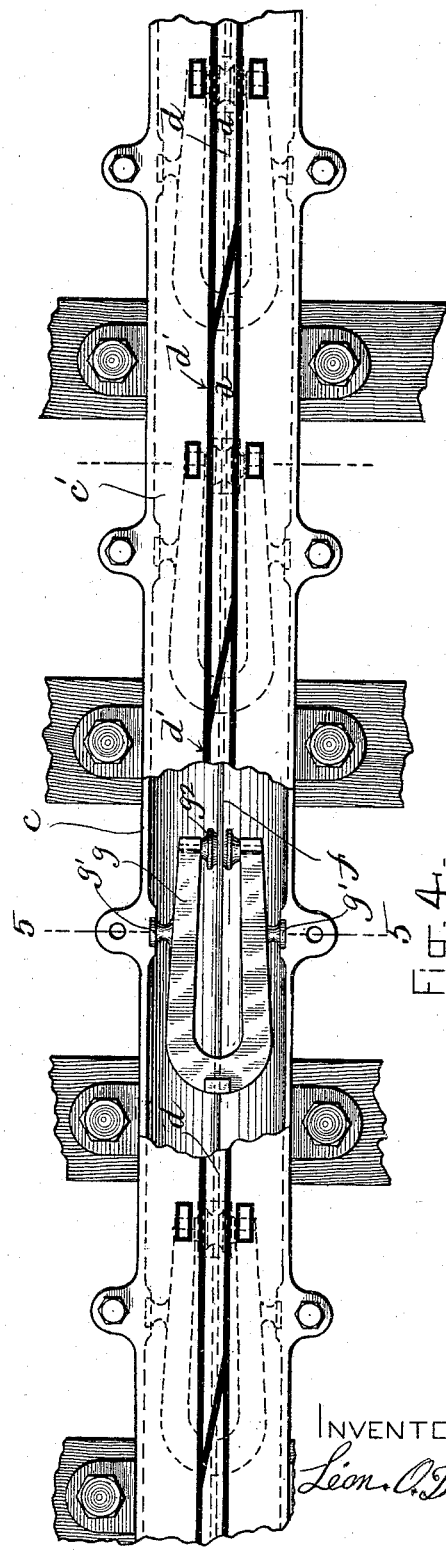
WITNESSES:
Thomas H. Seely.
Chas. J. Gooding.
INVENTOR:
Léon O. Dion (No Model.) 3 Sheets—Sheet 3.
L. O. DION.
CLOSED CONDUIT FOR ELECTRIC RAILWAYS.
No. 488,351. Patented Dec. 20, 1892.
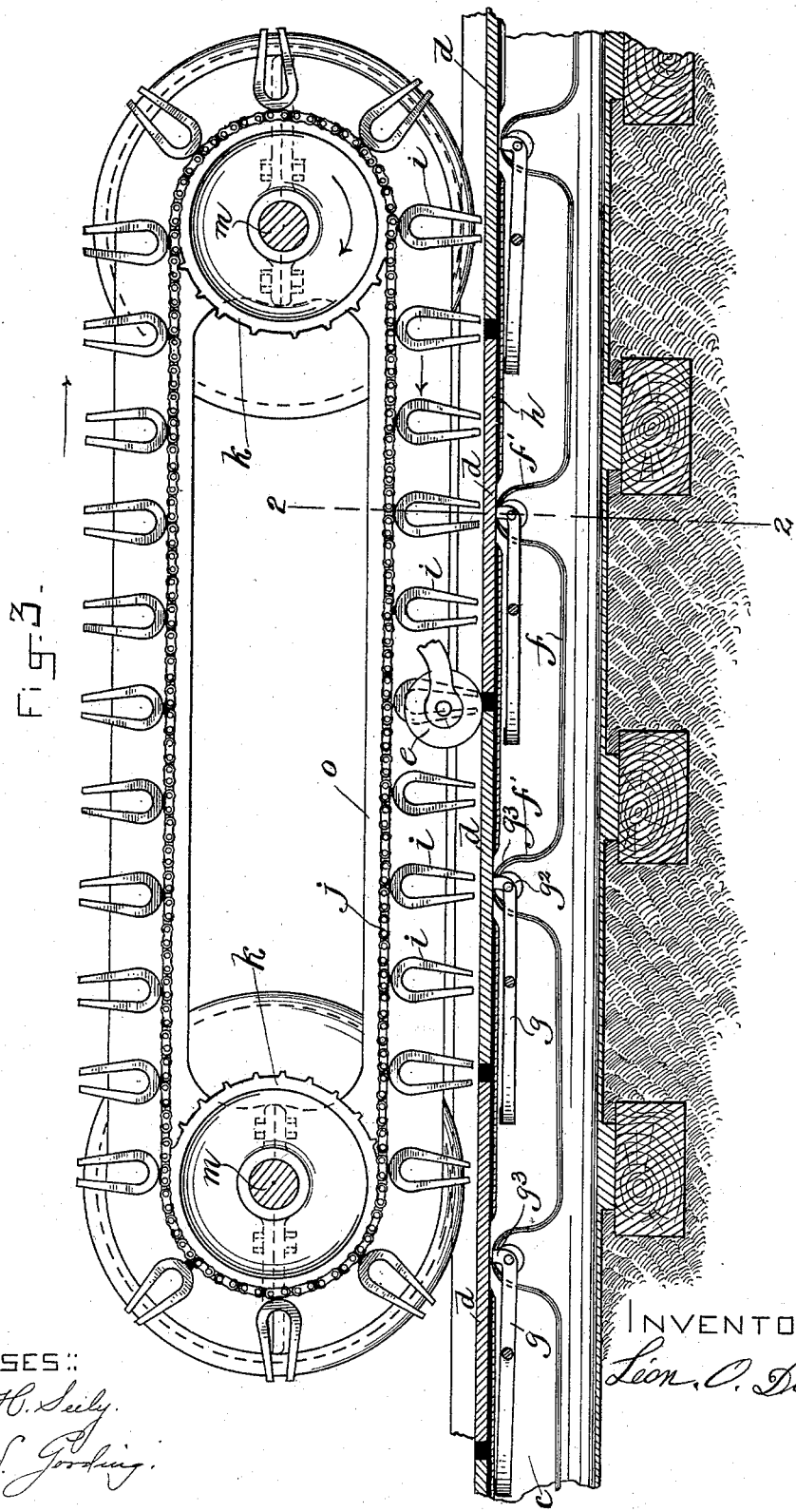
WITNESSES:
Thomas H. Seely.
Chas. S. Gooding.
INVENTOR:
Léon O. Dion

UNITED STATES PATENT OFFICE.

LÉON O. DION, OF NATICK, MASSACHUSETTS.

CLOSED CONDUIT FOR ELECTRIC RAILWAYS.

SPECIFICATION forming part of Letters Patent No. 488,351, dated December 20, 1892.

Application filed November 9, 1891. Serial No. 411,247. (No model.)

*To all whom it may concern:*

Be it known that I, LÉON O. DION, of Natick, in the county of Middlesex and State of Massachusetts, have invented certain new and useful Improvements in Electric-Railway Systems, of which the following is a specification.

This invention relates to an electric railway system, involving a conductor, connected with a source of electrical supply at a power station; a trolley track, adapted to make contact with a trolley connected with an electric motor on a car, said wire and trolley track being normally separated and adapted to be electrically connected by electrical attraction caused by suitable apparatus on the car, so that, as the car passes along over the track, an electrical contact will be established under it between the conductor and the trolley track whereby the current will be allowed to pass through the trolley track to the trolley and to the motor, the point of contact between the conductor and the trolley track progressing or moving with the car, the conductor being automatically separated from the track at all points excepting under a car equipped with suitable electric apparatus to cause the contact between the conductor and track.

The invention consists in the hereinafter described improvements, relating to a system substantially such as that above indicated.

Of the accompanying drawings, forming part of this specification: Figure 1 represents a side elevation of a motor car, provided with a trolley electrically connected to the motor and with apparatus adapted to establish an electrical connection between the conductor and the trolley track during the passage of the car over the track. Fig. 2 represents a transverse section of the road-bed and railway track, showing the conductor, the sub-way or conduit which contains the same, the trolley track, and a portion of the apparatus carried by the car to exert an attractive force whereby the conductor and trolley track are electrically connected under the car, said section being taken on the line 2—2 of Fig. 3. Fig. 3 represents a section on line 3—3 of Fig. 2, looking toward the right. Fig. 4 represents a top view of the sub-way or conduit, a portion of the cover thereof being broken away. Fig. 5 represents a section on line 5—5, Fig. 4. Fig. 6 represents a top view and Fig. 7 an edge view of one of the magnets pivotally connected with the sub-way and used to support the conductor.

The same letters of reference indicate the same parts in all the figures.

In the drawings: $a\,a$ represent the rails and $b$ the road-bed of a street railway track.

$c$ represents a sub-way or conduit, located below the road-bed between the rails and having a cover $c'$ which is substantially flush with the surface of the road-bed. The cover $c'$ supports a trolley track, which is composed of a series of sections $d$, of conducting material, located in a recess or cavity formed for their reception in the upper surface of the cover, and insulated from each other and from the cover by suitable beds $d'$ of insulating material, which may be hard rubber or any of the well-known materials used for insulating purposes. The ends of the sections $d$ are preferably beveled, as shown in Fig. 4, so that the trolley $e$, hereinafter referred to, which runs on the upper surface of said track, will not at any time be wholly separated from the metallic portions of the track by the insulation between the sections, the beveled form of the ends permitting one edge of the wheel to come in contact with one section before its other edge leaves the other section. The upper surfaces of the sections $d$ constitute a track, which is parallel with the track rails $a$, and is adapted to support a trolley wheel $e$, mounted on a car moving on the railway track, said trolley wheel being connected in any suitable way,—as by a wire $e'$, Fig. 1,—with an electric motor $e^2$, of any suitable construction, on the car, said motor being geared to one of the axles of the car in the usual or any well-known or suitable manner.

$f$ represents a conductor of electricity, which is preferably a wire connected with a source of electrical supply at a power station, and serving the usual purpose of a trolley wire in an electric railway system, excepting that it does not come into direct contact with the trolley wheel $e$. Said conductor is located in the sub-way $c$ directly under the trolley track, and is vertically movable in said sub-way, so that it can be brought in contact with either of the track sections $d$, said sections having portions of their under surfaces left bare or exposed, as shown in Fig. 3, to permit their electrical contact with the conductor $f$. The conductor is preferably supported in the subway by a series of pivoted magnets $g$, which are here shown as permanent magnets of a horse-shoe form, the arms of said magnets having trunnions $g'$ $g'$, which are mounted in bearings formed in the sides of the sub-way $c$. The pole ends of the magnets $g$ are provided with insulating supports $g^2$, journaled in said pole piece upon which the wire $f$ bears. Said supports may be of glass or other suitable insulating material grooved or channeled to receive the conductor. The conductor $f$ is preferably formed with a series of loops or bends $f'$, which rest upon the insulators $g^2$ and constitute the parts of the wire that are brought in contact with the sections of the trolley track, the main portion of the wire being depressed below the pivoted magnets $g$, as shown in Fig. 3. The pivotal points or trunnions of the magnets $g$ are so arranged that the magnets partially counterbalance the weight of the wire $f$, and suspend said wire just out of contact with the sections of the trolley-track, so that the wire is adapted to be raised with the minimum of resistance, by means presently described, the arrangement being such that, when there is no attractive force to raise the wire, its weight depresses the pole ends of the magnets $g$ until the opposite ends of the magnets bear upon supports $h$, which are located below and are insulated from the trolley track sections $d$, as shown at the right and left in Fig. 3.

It will be seen from the foregoing that the wire or conductor $f$ is adapted to be raised by magnetic or electric attraction exerted by an apparatus on a car passing over the track, and that, whenever the wire is so raised, the current flows from it through the trolley track section $d$ with which it is in contact, and passes from said section to the trolley $e$, and from thence to the motor, energizing the latter and causing it to impel a car in the usual way.

I prefer to employ as the electrical apparatus on the car which raises the wire $f$, a series of horse-shoe magnets $i$, which are arranged with their poles in close proximity to the upper surface of the cover $c'$ of the subway, and directly above the poles of the wire-supporting magnets $g$. It will be seen that, as the car moves along the track, the poles of the magnets $i$ and the poles of the magnets $g$ will tend to approach each other, in consequence of the attractive force exerted by each; and that, as a result of said force, the poles of the magnets $g$ will be raised, with the wire supported thereby, thus establishing electric contact between the wire and a section of the trolley track. As soon as the magnets $i$ on the car pass away from proximity to the magnets $g$, the latter are released and are caused by the weight of the wire to fall and thus permit the separation of the wire from the trolley track sections. I prefer to attach the magnets $i$ to a sprocket-chain $j$, which is mounted on sprocket-wheels $k$ $k$, affixed to the axles $m$ $m$ of the car, so that the rotation of said axles will cause the series of magnets to move in a direction opposite to the direction of movement of the car, so that said magnets will have little or no movement relatively to the sections of the trolly track over which they are located. This arrangement enables me to bring the magnets $i$ into close proximity to the track sections $d$ without causing wear on the poles of the magnets and on the track sections by contact of the poles with the sections. I do not limit myself, however, to the employment of a series of magnets supported by a sprocket-chain, as the magnets $i$ may be fixed with relation to the car, if preferred. I have here shown two series of magnets $i$, one at one side of the trolley $e$ and the other at the opposite side, this arrangement being preferable for many reasons, but I may use only one series of magnets $i$; and, in fact, may use but one magnet $i$ upon the car instead of a series.

I do not limit myself to the described means for exerting an attractive force upwardly toward the car, and thereby establishing contact between the conductor $f$ and the track sections. I believe myself to be the first to employ a trolley track interposed between a conductor and the trolley, the conductor being normally separated from the track, and to cause an electrical connection between the conductor and track by attractive force caused by apparatus on the car. Hence I desire to cover in the broadest manner within legal bounds any combination or organization whereby this result may be secured. The pivoted magnets $g$, which support the wire and partially counterbalance the same may be non-magnetic levers or arms adapted to accomplish the same mechanical function.

It will be obvious that I am not limited to the precise details shown and described, as I desire to claim broadly the loose main conductor adapted to be attracted in the passage of the car.

$o$ $o$ represent guards to protect the magnets $i$.

It will be seen that the subdivision of the trolley track into insulated sections prevents all portions of the track excepting those under the car from being charged with the electric current. The poles $g^3$ of the magnets $g$ are extended upwardly to bring them close to the under sides of the track sections $d$.

I claim:

1. In an electric railway system, the combination of a fixed trolley track composed of insulated conducting sections located on the road-bed, a vertically movable conducting wire located below and normally out of contact with the track, said wire having a series of bends or loops and a series of magnets pivoted to fixed supports below the track and provided between their poles with supports of insulating material engaged with the loops of the wire, as set forth.

2. A magnet adapted to be pivotally connected to a fixed support, so that its poles can rise and fall, and provided with off-set or upwardly extended poles and with an insulating support between said poles, as set forth.

3. In an electric railway system, the combination of a fixed trolley track composed of insulated conducting sections, a vertically movable conducting wire located below said track and adapted to be raised to make contact therewith, and a series of pivoted supports having rests of insulating material on which the wire bears, said supports being arranged to counterbalance the wire and permit it to be raised with the minimum of resistance, as set forth.

4. In an electric railway system, the combination of a way or conduit, a series of magnets pivotally connected with the sides of said conduit, a conducting wire supported by the pole ends of said magnets and adapted thereby to rise and fall, a removable cover for said conduit, and a trolley track supported by said cover over the wire and composed of a series of insulated conducting sections arranged to make contact with the wire when the latter is raised from its normal position, as set forth.

5. In an electric railway system, the combination of a fixed trolley track composed of insulated conducting sections located on the road-bed, a vertically movable conducting wire located below said track and normally out of contact therewith, a series of pivoted magnets the pole ends of which support said wire, and a car having a trolley adapted to run on said track, an electric motor connected with the trolley, and one or more magnets arranged with their poles in such relation to the poles of the wire-supporting magnets as to raise the latter and the wire, as set forth.

6. In an electric railway system, the combination of a fixed trolley track composed of insulated conducting sections located on the road-bed, a vertically movable conducting wire located below said track and normally out of contact therewith, and a car having a trolley adapted to run on said track, an electric motor connected with the trolley, and one or more magnets arranged on a chain or carrier receiving motion from the running gear of the car, said magnets being adapted to raise the wire into contact with the trolley track, as set forth.

In testimony whereof I have signed my name to this specification, in the presence of two subscribing witnesses, this 4th day of November, A. D. 1891.

LÉON O. DION.

Witnesses:
C. F. BROWN,
A. D. HARRISON.